United States Patent [19]

Baney et al.

[11] Patent Number: 4,666,872
[45] Date of Patent: May 19, 1987

[54] CERAMIC MATERIALS FROM SILAZANE POLYMERS

[75] Inventors: Ronald H. Baney, Midland; Duane R. Bujalski, Monitor Township, Bay County, both of Mich.

[73] Assignee: Dow Corning Corporation, Midland, Mich.

[21] Appl. No.: 837,245

[22] Filed: Mar. 7, 1986

Related U.S. Application Data

[63] Continuation-in-part of Ser. No. 652,938, Sep. 21, 1984, abandoned.

[51] Int. Cl.$^4$ .................. C04B 35/56; C04B 35/58
[52] U.S. Cl. .................................... 501/88; 501/92
[58] Field of Search ........................ 501/92, 88, 97

[56] References Cited

U.S. PATENT DOCUMENTS 4,040,619  7/1982  Gaul .................................. 427/228
4,312,970  1/1982  Gaul .................................. 526/279
4,540,803  9/1985  Cannady .......................... 556/412

OTHER PUBLICATIONS

Eaborn, C., "Organosilicon Compounds," Butterworth Scientific Pub., London, 1960, p. 1.

*Primary Examiner*—Mark L. Bell
*Attorney, Agent, or Firm*—Robert L. McKellar

[57] ABSTRACT

A method is disclosed for increasing the ceramic yield of a ceramic material obtained by firing a $R_3SiNH$-containing silazane polymer to an elevated temperature in an inert atmosphere or in a vacuum. The method involves adding certain metallic compounds to the $R_3SiNH$-containing silazane polymer prior to firing. Metallic compounds which increase the ceramic yield include ruthenium compounds, palladium compounds, silver compounds, indium compounds, iridium compounds, and platinum compounds.

28 Claims, No Drawings

CERAMIC MATERIALS FROM SILAZANE POLYMERS

This is a continuation-in-part of application Ser. No. 652,938, filed on Sept. 21, 1984, now abandoned.

BACKGROUND OF THE INVENTION

This invention relates to the preparation of ceramic materials from silazane polymers with increased ceramic yields. The ceramic materials of this invention are obtained by firing a mixture of a $R_3SiNH$-containing silazane polymer and certain metallic compounds to an elevated temperature in an inert atmosphere or in a vacuum. The metallic compound additives allow for the formation of ceramic materials with increased ceramic yield. These metallic compound additives include ruthenium compounds, palladium compounds, silver compounds, indium compounds, iridium compounds, and platinum compounds.

Ceramic material prepared from $R_3SiNH$-containing silazane polymers are known in the art. Gaul in U.S. Pat. No. 4,340,619 (issued July 20, 1982), which is hereby incorporated by reference, prepared ceramic materials by firing at elevated temperatures in an inert atmosphere a $R_3SiNH$-containing silazane polymer prepared by contacting and reacting, in an inert, essentially anhydrous atmosphere, chlorine-containing disilanes with disilazanes.

Gaul in U.S. Pat. No. 4,312,970, (issued Jan. 26, 1982), which is hereby incorporated by reference, obtained ceramics by firing a $R_3SiNH$-containing silazane polymer, prepared by contacting and reacting an organochlorosilane with a disilazane, at elevated temperatures in an inert atmosphere or in a vacuum.

Cannady in U.S. Pat. No. 540,803 issued Sept. 10, 1985, filed Nov. 28, 1983, which is hereby incorporated by reference, prepared ceramic materials from $R_3SiNH$-containing silazane polymers which were, in turn, prepared by contacting and reacting trichlorosilane and disilazanes.

What is newly discovered is that certain metallic compounds when added to $R_3SiNH$-containing silazane polymer prior to firing at elevated temperatures, allow for the formation of ceramic materials with a significant increase in ceramic yield relative to ceramic materials fired under the same conditions without the additives.

THE INVENTION

This invention relates to a method of preparing a ceramic material with increased ceramic yield, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a metallic compound selected from the group consisting of ruthenium compounds, palladium compounds, silver compounds, indium compounds, iridium compounds, and platinum compounds.

This invention also relates to a method of preparing a ceramic material with increased ceramic yield, said method comprising heating a modified $R_3SiNH$-containing silazane polymer in an inert atmosphere or in a vacuum to a temperature of at least 750° C. until said modified $R_3SiNH$-containingg silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a metallic compound selected from the group consisting of ruthenium compounds, palladium compounds, silver compounds, indium compounds, iridium compounds, and platinum compounds, wherein said non-modified $R_3SiNH$-containing silazane polymer is prepared by contacting and reacting in an inert, essentially anhydrous atmosphere, a chlorine-containing disilane or a mixture of chlorine-containing disilanes of general formula $$(Cl_bR_c'Si)_2$$

with a disilazane of general formula $$(R_3Si)_2NH$$

at a temperature in the range of 25° C. to 300° C. while distilling by-produced volatile products, wherein R' is a vinyl group, an alkyl group of 1–3 carbon atoms, or a phenyl group; R is a hydrogen atom, a vinyl group, an alkyl group of 1–3 carbon atoms, or a phenyl group; b has a value 0.5–3; c has a value 0–2.5; and the sum of (b+c) is equal to three.

This invention also relates to a method of preparing a ceramic material with increased ceramic yield, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a metallic compound selected from the group consisting of ruthenium compounds, palladium compounds, silver compounds, indium compounds, iridium compounds and platinum compounds, wherein said non-modified $R_3SiNH$-containing silazane polymer is prepared by contacting and reacting in an inert, essentially anhydrous atmosphere, an organochlorosilane or a mixture of organochlorosilanes of general formula $$R_n'SiCl_{(4-n)}$$

with a disilazane of general formula $$(R_3Si)_2NH$$

at a temperature in the range of 25° C. to 300° C. while distilling by-produced volatile products, wherein R' is a vinyl group, an alkyl group of 1–3 carbon atoms, or a phenyl group; R is a hydrogen atom, a vinyl group, an alkyl group of 1–3 carbon atoms, or a phenyl group; and n has a value of 1 or 2.

This invention further relates to a method of preparing a ceramic material with increased ceramic yield, said method comprising heating a modified R₃SiNH-containing silazane polymer in an inert atmosphere or in a vacuum to a temperature of at least 750° C. until said modified R₃SiNH-containing silazane polymer is converted to a ceramic material with increased ceramic yield relative to a non-modified R₃SiNH-containing silazane polymer heated under the same conditions, wherein said modified R₃SiNH-containing silazane polymer is prepared by mixing the non-modified R₃SiNH-containing silazane polymer with an effective, ceramic yield increasing, amount of a metallic compound selected from the group consisting of ruthenium compounds, palladium compounds, silver compounds, indium compounds, iridium compounds, and platinum compounds, wherein said non-modified R₃SiNH-containing silazane polymer is prepared by contacting and reacting in an inert, essentially anhydrous atmosphere, trichlorosilane with a disilazane at a temperature in the range of 25° C. to 300° C. while distilling by-produced volatile products, wherein said disilazane has the general formula:

(R₃Si)₂NH when R is a hydrogen atom, a vinyl group, an alkyl group containing 1-3 carbon atoms, or a phenyl group.

Ceramic yield, as employed in this present specification, is the percentage yield of the ceramic product upon firing a modified or non-modified R₃SiNH-containing silazane polymer to an elevated temperature under an inert atmosphere or in a vacuum until the modified or non-modified R₃SiNH-containing silazane polymer is converted to a ceramic material. The ceramic yield is calculated by dividing the weight of the ceramic product obtained by the initial weight of the modified or non-modified R₃SiNH-containing silazane polymer and then multiplying the result by 100. A correction for the amount of metallic compound is not made.

The process of this invention is carried out by first mixing a R₃SiNH-containing silazane polymer with an effective amount of a metallic compound and then firing the resulting mixture to an elevated temperature under an inert atmosphere or in a vacuum until the resulting mixture is converted to a ceramic material. By "metallic compounds" we mean both the finely divided metal as well as various inorganic compounds or organometallic compounds incorporating the metal atom. Therefore, for example, "platinum compounds" is meant to include platinum metal as well as various inorganic compounds or organometallic compounds incorporating platinum. Suitable metallic compound additives for the practice of this invention include ruthenium compounds, palladium compounds, silver compounds, indium compounds, iridium compounds, and platinum compounds. Indium metal is not considered suitable for this present invention because of its low melting point.

Suitable ruthenium compounds include finely divided ruthenium metal and compounds such as ruthenium (III) bromide, ruthenium (III) 2,4-pentanedionate, ruthenium (III) chloride, ruthenium (III) iodide, dichlorotricarbonylruthenium (II) dimer, dodecacarbonyltriruthenium, and the like. The preferred metallic compound containing ruthenium is ruthenium (III) is 2,4-pentanedionate.

Suitable palladium compounds include finely divided palladium metal and compounds such as palladium (II) bromide, palladium (II) 2,4-pentanedionate, palladium (II) chloride, palladium (II) iodide, palladium (II) nitrate, trimer of palladium (II) acetate, and the like. The preferred metallic compound containing palladium for the practice of this invention is palladium (II) 2,4-pentanedionate.

Suitable silver compounds include finely divided silver and compounds such as silver bromide, silver acetate, silver 2,4-pentanedionate, silver cyclohexanebutyrate, silver chloride, silver (I) fluoride, silver (II) fluoride, silver iodide, silver iodate, silver nitrate, silver carbonate, silver phosphate and the like. Preferred metallic compounds containing silver are silver nitrate and silver 2,4-pentanedionate.

Suitable metallic compounds containing indium include indium compounds such as indium bromide, indium acetate, indium 2,4-pentanedionate, indium chloride, indium fluoride, indium nitrate, indium isopropoxide, and the like. Preferred metallic compounds containing indium are indium 2,4-pentanedionate and indium isopropoxide.

Suitable iridium compounds include finely divided iridium metal and compounds such as iridium (III) 2,4-pentanedionate, bis(triphenylphosphine)iridium bromide, bis(triphenylphosphine)iridium chloride, bis(triphenylphosphine)iridium iodide, iridium (III) chloride, iridium (IV) chloride, carbonylhydridotri-(triphenylphosphine)iridium, and the like. Preferred metallic compounds containing iridium include bis(triphenylphosphine)iridium bromide, bis(triphenylphoshine)iridium chloride, and bis(triphenylphosphine)iridium iodide.

Suitable platinum compounds include finely divided platinum metal and compounds such as platinum (II) bromide, platinum (IV) bromide, dihydrogen hexachloroplatinate (IV) (commonly referred to as chloroplatinic acid), diido(cycloocta-1,5-diene)platinum (II), platinum (II) 2,4-pentanedionate, bis(triphenylphosphate)platinum (II) chloride, platinum (II) chloride, platinum (IV) chloride, and the like. The preferred metallic compound containing platinum is chloroplatinic acid.

The method of mixing the R₃SiNH-containing silazane polymer and the metallic compound is not critical. It is preferred that the silazane polymer and the metallic compound be well mixed to help insure that the ceramic yield does not vary significantly throughout the ceramic material or article. Using an organic solvent such as toluene for the mixing medium helps to insure that the two components are well mixed. Other mixing techniques may be used.

The R₃SiNH-containing silazane polymer is mixed with an effective amount of a metallic compound. By "an effective amount" of the metallic compound we mean that amount which results in an increased ceramic yield in the resulting ceramic material. Generally the metallic compound is added at such a level so as to obtain a mixture containing the R₃SiNH-containing silazane polymer and 0.1 to 2.0 weight percent of the metal associated with the metallic compound. The metallic compound may be added at higher levels although no added benefits may result. It is preferred that the metallic compound be present at a level equivalent to about 0.5 to 1.5 weight percent of the metal associated with the metallic compound. The increase in ceramic yield of the ceramic material prepared by the method of this invention is determined by comparison with the ceramic yield of a ceramic material obtained by firing the same R₃SiNH-containing silazane polymers, without the added metallic compounds, under the same experimental conditions.

The mixture of R₃SiNH-containing silazane polymer and an effective amount of a metallic compound is fired to an elevated temperature of at least 750° C. under an inert atmosphere or in a vacuum until the mixture is converted to a ceramic material.

Although not wishing to be held to such a theory, we believe that the metallic compound additives of this invention interact with the R₃SiNH-containing silazane during the early stages of the pyrolysis step. The interaction may be in the form of crosslinking or the promotion of crosslinker of potentially volatile species from the R₃SiNH-containing silazane polymer. By keeping the potentially volatile material in the system more carbon, nitrogen, and silicon are available for conversion to ceramic in the latter stages of the pyrolysis step. It is expected that the inorganic compounds will be reduced to the metal during the pyrolysis.

Silazane polymers suitable for use in the present invention are R₃SiNH-containing silazane polymers. R₃SiNH-containing silazane polymers especially useful in this invention are described in U.S. Pat. Nos. 4,312,970 and 4,340,619 and U.S. Pat. No. 4,540,803 issued Sept. 10, 1985 filed Nov. 28, 1983, all of which have been incorporated by reference.

The silazane polymers described in U.S. Pat. No. 4,312,970 are prepared by contacting and reacting in an inert, essentially anhydrous, atmosphere, an organochlorosilane or a mixture of organochlorosilanes of the general formula $R_n'SiCl_{(4-n)}$ with a disilazane having the general formula $(R_3Si)_2NH$ at a temperature in the range of 25° C. to 300° C. while distilling by-produced volatile products,
wherein
R' is a vinyl group, an alkyl group of 1-3 carbon atoms, or a phenyl group;
R is a hydrogen atom, a vinyl group, an alkyl group of 1-3 carbon atoms, or a phenyl group; and
n has a value of 1 or 2.

The organochloromonosilanes of U.S. Pat. No. 4,312,970 are those having the general formula $R_n'SiCl_{(4-n)}$ where R' is vinyl or an alkyl radical containing 1-3 carbon atoms or the phenyl group. Thus, those groups which are contemplated as being useful in this invention are methyl, ethyl, propyl, vinyl and phenyl.

The R' groups can all be the same or they can be different. The organochloromonosilanes are common commodity chemicals and are commercially available.

The value of n is 1 or 2. Thus, single organic group substituted silanes such as $CH_3SiCl_3$, $C_6H_5SiCl_3$, $CH_2=CHSiCl_3$, $CH_3CH_2SiCl_3$ or $CH_3(CH_2)_2SiCl_3$ and double organic group substituted silanes such as $(CH_3)_2SiCl_2$, $(C_2H_5)_2SiCl_2$ and $(CH_2=CH)(CH_3)SiCl_2$ and mixtures of such silanes, for example $CH_3SiCl_3$ and $(CH_3)_2SiCl_2$, can be used. It is preferred that when organochlorosilane mixtures are used, the number of units of diorgano-substituted silicon atoms should not exceed the number of units of monoorgano-substituted silicon atoms.

The silazane polymers of U.S. Pat. No. 4,340,619, which are the preferred silazane polymers for the practice of this invention, are prepared by contacting and reacting in an inert, essentially anhydrous, atmosphere, a chlorine-containing disilane or a mixture of chlorine-containing disilanes, of the general formula $(Cl_bR_c'Si)_2$ with a disilazane having the general formula $(R_3Si)_2NH$ at a temperature in the range of 25° C. to 300° C. while distilling by-produced volatile products,
wherein
R' is a vinyl group, an alkyl group of 1-3 carbon atoms, or a phenyl group;
R is a hydrogen atom, a vinyl group, an alkyl group of 1-3 carbon atoms, or phenyl group;
b has a value of 0.5-3;
c has a value of 0-2.5; and the sum of (b+c) is equal to three.

The chlorine-containing disilanes of U.S. Pat. No. 4,340,619 are those disilanes having the general formula $(Cl_bR_c'Si)_2$ where R' is vinyl, an alkyl radical containing 1-3 carbon atoms or the phenyl group. Thus, the R' groups are methyl, ethyl, propyl, vinyl and phenyl. The R' groups can all be the same or they can be different. The chlorine-containing disilanes can be those found in the residue from the Direct Process for producing halosilanes (Eaborn, C., "Organosilicon Compounds", Butterworth Scientific Publications, London, 1960, pg. 1). The Direct Process is the reaction between silicon metal and aliphatic halides, generally methyl chloride, at elevated temperature in the presence of catalyst, generally copper, to produce chlorosilanes.

For the chlorine-containing disilanes described above, the value of b and c is from 0.5-3 and 0-2.5, respectively, and the sum of (b+c) is equal to three. Examples of chlorine-containing disilanes are $[Cl(CH_3)_2Si]_2$, $[Cl_2CH_3Si]_2$, $[Cl_2C_2H_5Si]_2$, $[Cl(C_6H_5)_2Si]_2$, and $[Cl_2CH_2=CHSi]_2$.

Monosilanes can also be used in admixtures with the above described chlorine-containing disilanes. Examples include $CH_3SiCl_3$, $(CH_3)_2SiCl_2$, $H(CH_3)_2SiCl$, $(CH_3)_3SiCl$, $(CH_2=CH)(CH_3)_2SiCl$, $(C_2H_5)_2SiCl_2$, $C_6H_5SiCl_3$, as well as $(C_6H_5)_2SiCl_2$, and $(C_6H_5)_3SiCl$.

When polysilzane polymers are prepared in accordance with U.S. Pat. No. 4,340,619 for use in this invention it is preferred that mixtures of chlorine-containing disilanes be employed where the number of units of diorgano-substituted silicon atoms does not exceed the number of units of monoorgano-substituted silicon atoms.

The silazane polymes of U.S. Pat. No. 4,540,803 issued Sept. 10, 1985 are prepared by contacting and reacting in an inert, essentially anhydrous atmosphere, trichlorosilane with a disilazane at a temperature in the range of 25° C. to 300° C. while removing by-produced volatile products, wherein said disilazane has the general formula $(R_3Si)_2NH$ where R is selected from the group consisting of vinyl, hydrogen, phenyl, and alkyl radicals containing 1 to 3 carbon atoms. It appears that some component, possibly a hydrolysis product, in aged trichlorosilane is detrimental in the preparation of this $R_3SiNH$-containing silazane polymer. Such contaminated trichlorosilane can be suitably purified by distillation. Other purification methods may also be employed. It is also preferred that the reactants be added in such a manner that the initial reaction exotherm is kept to a minimum. One reactant may be added slowly to the other reactant, or the added reactant may be cooled, or the reaction vessel may be cooled to keep the reaction exotherm low. Other methods or combination of methods may also be used. In general, it is preferred that the reaction be controlled such that the initial reaction temperature due to the exotherm is less than about 50° C., and most preferably, less than 35° C. In general, more reproducible results are obtained when purified trichlorosilane is used and when the initial reaction exotherm is controlled carefully.

The second reactant in U.S. Pat. Nos. 4,312,970 and 4,340,619 and U.S. Pat. No. 4,540,803 issued Sept. 10, 1985 disilazane of the general formula $(R_3Si)_2NH$. R in this formula is vinyl, hydrogen, an alkyl radical of 1–3 carbon atoms or the phenyl group. Therefore, R, for purposes of this formula is represented by hydrogen, methyl, ethyl, propyl, vinyl and phenyl. Each R group in this formula can be the same or they can be different. Examples of the disilazanes include:
$[(CH_3)_3Si]_2NH$, $[C_6H_5(CH_3)_2Si]_2NH$,
$[(C_6H_5)_2CH_3Si]_2NH$, $[CH_2{=}CH(CH_3)_2Si]_2NH$,
$[CH_2{=}CH(CH_3)C_6H_5Si]_2NH$,
$[CH_2{=}CH(C_6H_5)_2Si]_2NH$,
$[CH_2{=}CH(C_2H_5)_2Si]_2NH$, $[H(CH_3)_2Si]_2NH$ and
$[CH_2{=}CH(C_6H_5)C_2H_5Si]_2NH$.

These reactants are brought together in an inert, essentially anhydrous atmosphere. By "inert" we mean that the reaction is carried out under a blanket of inert gas, such as argon, nitrogen, or helium. What we mean by "essentially anhydrous" is that the reaction is preferably carried out in an absolutely anhydrous atmosphere but minute amounts of moisture can be tolerated.

When the reactants are contacted with each other, as described in U.S. Pat. Nos. 4,312,970 and 4,340,619 and U.S. Pat. No. 4,540,803 issued Sept. 10, 1985, the reaction begins which forms an intermediate amino compound. Upon heating, additional amino compound is formed and upon continued heating, $R_3SiCl$ is distilled from the reaction mixture and a silazane polymer is formed. The order of addition of the material does not appear to be critical. As the temperature is raised higher, more condensation takes place and cross-linking occurs with residual $R_3Si$— that is not distilled from the mixture acting as a chain-stopper. This control allows one to stop the reaction at any point to obtain almost any desired viscosity. The desirable temperature range for this reaction is 25° C. to 300° C. A preferred temperature range for this reaction is 125°–300° C. The length of time that the reaction requires depends on the temperature employed and the viscosity one wishes to achieve.

What is meant by "volatile products" are the distillable by-produced products that are formed by the reactions set forth above. These materials can be represented by $(CH_3)_3SiCl$, $(CH_2{=}CH)(C_6H_5)_2SiCl$, $CH_3(C_6H_5)_2SiCl$, $(CH_3)_2C_6H_5SiCl$ and $(CH_2{=}CH)(CH_3)_2SiCl$. Sometimes, the process requires the use of a vacuum along with the heat in order to remove these materials from the reaction mixture.

After the $R_3SiNH$-containing silazane polymer and the metallic compound are mixed, the mixture is fired to an elevated temperature of at least 750° C. until the mixture is converted to a ceramic material. It is generally preferred that the $R_3SiNH$-containing silazane polymer and metallic compound mixture be vacuum stripped prior to pyrolysis. If the silazane polymer and metallic compound mixture is of sufficient viscosity or if it possesses a sufficiently low melt temperature, it can be shaped first and then pyrolyzed to give a silicon nitride-containing shaped article such as a fiber. The silazane polymer and metallic compound mixture can be filled with ceramic type fillers (if desired) and then fired to at least 750° C. to obtain ceramic materials or ceramic articles.

The silazane polymer and metallic compound mixtures of this invention can be used in both the filled and unfilled state, depending on the application. Thus, it is contemplated within the scope of this invention to coat substrates with filled and unfilled mixtures and heat the substrates to produce ceramic coated articles. Fillers and adjuvants can be milled on 3 roll mills by simply mixing the polymers and metallic compounds of this invention with the fillers and making several passes on the mill. In the alternative, the polymers and metallic compounds can be placed in solvents and the fillers and adjuvants can be added thereto and after mixing the solvent can be removed to give the filled polymer mixture. The coating can be carried out by conventional means. The means used depends on the polymer mixture and substrates used and the application one has in mind. Thus, these materials can be brushed, rolled, dipped or sprayed. In the filled state, it is sometimes necessary to trowel the mixture onto the substrate. The silazane polymer and metallic compound mixtures of this invention may also be used as an infiltrant with ceramic materials or as a matrix material for composites. Other uses will be apparent to those skilled in the art from a consideration of this specification.

So that those skilled in the art can better appreciate and understand the invention, the following examples are given.

In the examples, two basic mixing techniques were employed to mix the $R_3SiNH$-containing silazane polymer and the metallic compounds.

Solution method. For metallic compounds soluble in toluene a solution method for mixing was employed. The desired amount of the metallic compound additive was dissolved in dry toluene. The $R_3SiNH$-containing silazane polymer was added to the toluene solution to give a 35 weight percent solution. The resulting solution was placed in a glass jar, purged with argon, and then sealed. The solution was then agitated for 16 hours on a wheel mixer. Solvent was removed from the modified $R_3SiNH$-containing silazane by vacuum stripping for three hours at 25° C. and 3 mm Hg and for one hour at 50° C. and 2 mm Hg. On occasion, other solvents such as acetone, hexane, or mineral spirits were employed.

For metallic compounds insoluble in toluene the following method was employed.

Wet milling method. The required amount of metallic compound was added to a 50 weight percent solution of the $R_3SiNH$-containing silazane polymer in dry toluene in a half-pint mill jar. After adding ceramic milling balls, the jar was purged with argon and sealed. The sample was wet milled for 16 hours. The solvent was removed as in the solution method. On occasion, other solvents such as acetone, hexane, or mineral spirits were used.

All mixed samples were stored under argon in a dry box until used.

All samples were fired in an Astro Industries Furnace 1000A water cooled graphite heated model 1000.3060-FP-12 under a helium atmosphere. All samples were fired to 1300° C. over a 5.6 hour time period, held at 1300° C. for 12 minutes, and then cooled to room temperature. During firing the temperature was increased to 600° C. at a rate of 2.8° C./min, then increased from 600° C. to 800° C. at a rate of 3.3° C./min, then increased from 800° C. to 1300° C. at a rate of 41.7° C./min, held at 1300° C. for 12 minutes, and then cooled at a rate of 36° C./min.

In the examples, control samples were subjected to the same treatment (i.e., the solution or wet milling mixing methods) as the metallic compound-containing silazane polymer except that the control samples did not contain the metallic compound. The ceramic yield of control samples that were subjected to the mixing procedure and control samples that were not subjected to the mixing procedure were essentially identical when fired to elevated temperatures under the same pyrolysis conditions.

EXAMPLE 1

A $(CH_3)_2SiNH$-containing silazane polymer prepared by the procedure outlined in U.S. Pat. No. 4,340,619 was employed in this example. A mixture of methylchlorodisilanes (26 pounds), consisting of 42.5 weight percent of $Cl_2(CH_3)SiSi(CH_3)Cl_2$, 35.6 weight percent of $Cl(CH_3)_2SiSi(CH_3)Cl_2$, 9.5 weight percent $Cl(CH_3)_2SiSi(CH_3)_2Cl$, and 12.4 weight percent of low boiling chlorosilane, and hexamethyldisilazane (42.2 pounds) were reacted in a 72 liter stainless steel reactor under a nitrogen atmosphere. The reaction temperature was raised to 195° C. at a rate of 0.97° C./min while volatile by-products were removed by distillation. The resulting solid $(CH_3)_3SiNH$-containing silazane polymer had a softening temperature of 68° C.

Silver nitrate was mixed with the $(CH_3)_3SiNH$-containing silazane polymer using the wet milling technique. The resulting mixture contained 1.0 weight percent silver based on the total weight of the mixture. Samples were then fired to 1300° C. under helium. Duplicate results for the $AgNO_3$ modified sample were obtained. The ceramic yield for the control sample (non-modified polymer) is an average of several experiments. The results are presented in Table I.

TABLE I

| Additive | Ceramic Yield, % | Increase in Ceramic Yield, %, Relative to Control |
|---|---|---|
| NONE (control) | 57.7 | — |
| $AgNO_3$ | 65.3 | 13.2 |
| $AgNO_3$ | 66.7 | 15.6 |

EXAMPLE 2

Using the same $(CH_3)_3SiNH$-containing silazane polymer as described in Example 1, a mixture containing 1.0 weight percent ruthenium and the silazane polymer was prepared by mixing the silazane polymer and ruthenium 2,4-pentanedionate by the solution method. The polymer was fired to 1300° C. under helium. The results are presented in Table II.

TABLE II

| Additive | Ceramic Yield, % | Increase in Ceramic Yield, %, Relative to Control |
|---|---|---|
| NONE (control) | 58.4 | — |
| $Ru(C_5H_7O_2)_3$ | 67.5 | 13.5 |

EXAMPLE 3

The same $(CH_3)_3SiNH$-containing silazane polymer as described in Example 1 was employed. A modified $(CH_3)_3SiNH$-containing silazane polymer was prepared by the wet milling technique by mixing the silazane polymer with bis(triphenylphosphine)iridium chloride. The modified silazane polymer contained 1.0 weight percent iridium. The modified silazane polymer was fired to 1300° C. under helium. The results are presented in Table III.

TABLE III

| Additive | Ceramic Yield, % | Increase in Ceramic Yield, %, Relative to Control |
|---|---|---|
| NONE (control) | 56.4 | — |
| $[P(C_6H_5)_3]_2IRCl$ | 63.4 | 12.4 |

EXAMPLE 4

The $(CH_3)_3SiNH$-containing silazane polymer of Example 1 was used in this example. A modified silazane polymer containing 1.0 weight percent indium was prepared by the wet milling technique using indium isopropoxide as the metallic compound additive. The modified silazane polymer was fired to 1300° C. in a helium atmosphere. The results are presented in Table IV.

TABLE IV

| Additive | Ceramic Yield, % | Increase in Ceramic Yield, % Relative to Control |
|---|---|---|
| NONE (control) | 56.4 | — |
| $In(OC_4H_8)_3$ | 62.2 | 10.3 |

EXAMPLE 5

The $(CH_3)_3SiNH$-containing silazane polymer of Example 1 was also used in this example. A modified silazane polymer containing 1.0 weight percent palladium was prepared by wet milling the silazane polymer and palladium 2,4-pentanedionate. The modified polymer was fired in helium to 1300° C. The results are presented in Table V.

TABLE V

| Additive | Ceramic Yield, % | Increase in Ceramic Yield, %, Relative to Control |
|---|---|---|
| NONE (control) | 56.4 | — |

TABLE V-continued

| Additive | Ceramic Yield, % | Increase in Ceramic Yield, %, Relative to Control |
|---|---|---|
| Pd(C₅H₇O₂)₂ | 61.8 | 9.6 |

EXAMPLE 6

This example shows the effect of platinum at several levels on the ceramic yield of $R_3SiNH$-containing silazane polymer. The $(CH_3)_3SiNH$-containing silazane polymer of Example 1 was employed in this example. The modified silazane polymer was prepared by the solution technique using chloroplatinic acid as the metallic compound. The samples were then fired to 1300° C. under helium. The control sample is an average of several runs. The results are presented in Table VI.

TABLE VI

| Additive | Pt Level, % | Ceramic Yield, % | Increase in Ceramic Yield, %, Relative to Control |
|---|---|---|---|
| NONE | 0 | 52.7 | — |
| H₂PtCl₆.6H₂O | 0.01 | 53.7 | 1.9 |
| H₂PtCl₆.6H₂O | 0.025 | 55.0 | 4.4 |
| H₂PtCl₆.6H₂O | 0.05 | 56.4 | 7.0 |
| H₂PtCl₆.6H₂O | 0.05 | 56.2 | 6.6 |
| H₂PtCl₆.6H₂O | 0.05 | 55.4 | 5.1 |
| H₂PtCl₆.6H₂O | 0.1 | 57.4 | 8.9 |
| H₂PtCl₆.6H₂O | 1.0 | 63.7 | 20.9 |
| H₂PtCl₆.6H₂O | 1.0 | 64.8 | 23.0 |

EXAMPLE 7

A modified $(CH_3)_3SiNH$-containing silazane polymer with 1.0 weight percent platinum (added as chloroplatinic acid) was prepared exactly as in Example 6 using the same silazane polymer as described in Example 1. A thermogravimetric analysis (TGA) was carried out on both modified and non-modified $(CH_3)_3SiNH$-containing silazane polymer using a DuPont 950 TGA instrument with a 200 cc/min flow of argon and a heating rate of 10° C./min. At room temperature to 400° C. the modified silazane polymer had a 22 percent weight loss whereas the non-modified silazane polymer had a 35 percent weight loss. From 400° C. to 700° C. the modified silazane polymer lost an additional 11 weight percent and the non-modified silazane polymer lost an additional 18 weight percent. From 700° C. to 1000° C. the additional weight loss for the modified silazane polymer was 3 percent whereas for the non-modified silazane polymer the additional weight loss was 1 percent. Overall (from room temperature to 1000° C.) the modified (1 percent platinum) silazane polymer experienced a 36 percent weight loss (64 percent ceramic yield) and the non-modified silazane polymer experienced a 54 percent weight loss (46 percent ceramic yield).

EXAMPLE 8

This example is included for comparison purposes only. Using the silazane polymer of Example 1, a series of additives were examined to determine their effect on the ceramic yield. The additives were present at levels corresponding to about 1.0 weight percent of the element. None of the additives significantly increased ceramic yield. The additives are given in Table VII.

TABLE VII

| Element | Additives Which Did Not Enhance Ceramic Yield Additive |
|---|---|
| Al | Aluminum sec-butoxide |
|  | Aluminum oxide |
|  | Aluminum acetylacetonate |
| Ba | Barium octoate |
| C | Carbon black |
| Ce | Cerium (III) octoate |
| Cr | Chromium metal |
| Co | Cobalt (II) octoate |
| Cu | Copper (II) octoate |
| Hf | Bis(cyclopentadienyl)hafnium dichloride |
| Fe | Iron (III) oxide |
|  | Iron (III) octoate |
|  | Iron (II) acetylacetonate |
|  | Nonacarbonyldiiron |
|  | Iron (III) chloride |
| Pb | Lead (II) octoate |
| Mg | Ethyl magnesium bromide |
| Mn | Manganese (II) octoate |
|  | Manganese (IV) octoate |
| Hg | Mercury (II) octoate |
| Mo | Molybdenum (VI) octoate |
| Ni | Nickel metal |
|  | Nickel (II) octoate |
| Os | Ammonia hexabromoosmate |
| P | Phosphoric acid |
| Rh | Rhodium chloride |
| Sr | Strontium acetylacetonate |
| S | Elemental sulfur |
| Sn | Tin metal |
|  | Tin (II) laurate |
| Ti | Titanium dioxide |
| W | Mesitylene tricarbonyl tungstate |
| V | Vanadium metal |
|  | Vanadium (III) acetylacetonate |
| Y | Yttrium acetylacetonate |
| Zn | Zinc metal |
|  | Zinc (II) octoate |
| Zr | Zirconium octoate |
| Fe/Ni | Iron (III) octoate and Nickel (II) octoate |
| Fe/Cu | Iron (III) octoate and Copper (II) octoate |
| Co/Cu | Cobalt (II) octoate and Copper (II) octoate |
| Ti/C | Titanium dioxide and Carbon black |

That which is claimed is:

1. A method of preparing a ceramic material with increased ceramic yield, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a metal or metal compound selected from the group consisting of (i)
   a. finely divided ruthenium metal,
   b. ruthenium (III) bromide,
   c. ruthenium (III) 2,4-pentanedionate,
   d. ruthenium (III) chloride,
   e. ruthenium (III) iodide,
   f. dichlorotricarbonylruthenium (II) dimer and
   g. dodecacarbonyltriruthenium;

(ii)

a. finely divided palladium metal,
b. palladium (II) bromide,
c. palladium (II) 2,4-pentanedionate,
d. palladium (II) chloride,
e. palladium (II) iodide,
f. palladium (II) nitrate and
g. trimer of palladium (II) acetate;
(iii)
a. finely divided silver metal,
b. silver bromide,
c. silver acetate,
d. silver 2,4-pentanedionate,
e. silver cyclohexanebutyrate,
f. silver chloride,
g. silver (I) fluoride,
h. silver (II) fluoride,
i. silver iodate,
j. silver nitrate,
k. silver carbonate and
l. silver phosphate;
(iv)
a. indium bromide,
b. indium acetate,
c. indium 2,4-pentanedionate,
d. indium chloride,
e. indium fluoride,
f. indium nitrate and
g. indium isopropoxide;
(v)
a. finely divided iridium metal,
b. iridium (III) 2,4-pentanedionate
c. bis-(triphenylphosphine)iridium bromide,
d. bis-(triphenylphosphine)iridium chloride,
e. bis-(triphenylphosphine)iridium iodide,
f. iridium (III) chloride,
g. iridium (IV) chloride and
h. carbonylhydrido-tri-(triphenylphosphine)iridium;
(vi)
a. finely divided platinum metal, ;p1 b. platinum (II) bromide,
c. platinum (IV) bromide,
d. dihydrogen hexachloroplatinate (IV),
e. diiido(cycloocta-1,5-diene)platinum (II),
f. platinum (II) 2,4-pentanedionate,
g. bis-(triphenylphosphine)platinum (II) chloride,
h. platinum (II) chloride and
i. platinum (IV) chloride.

2. A method of preparing a ceramic material with increased ceramic yield, said method comprising heating a modified $R_3SiNH$-containing silazane polymer in an inert atmosphere or in a vacuum to a temperature of at least 750° C. until said modified $R_3SiNH$-containing silazane polymer is converted to a ceramic material with increased ceramic yield relative to a non-modified $R_3SiNH$-containing silazane polymer heated under the same conditions, wherein said modified $R_3SiNH$-containing silazane polymer is prepared by mixing the non-modified $R_3SiNH$-containing silazane polymer with an effective, ceramic yield increasing, amount of a metal or metal compound, wherein said non-modified $R_3SiNH$-containing silazane polymer is prepared by contacting and reacting in an inert, essentially anhydrous atmosphere, a chlorine-containing disilane or a mixture of chlorine-containing disilanes of general formula $$(Cl_bR_c'Si)_2$$

with a disilazane of general formula $$(R_3Si)_2NH$$

at a temperature in the range of 25° C. to 300° C. while distilling by-produced volatile products, wherein R' is a vinyl group, an alkyl group of 1-3 carbon atoms, or a phenyl group; R is a hydrogen atom, a vinyl group, an alkyl group of 1-3 carbon atoms, or a phenyl group; b has a value of 0.5-3; c has a value of 0-2.5; and the sum of (b+c) is equal to three and, wherein the metal or metal compound is selected from the group consisting of
(i)
a. finely divided ruthenium metal,
b. ruthenium (III) bromide,
c. ruthenium (III) 2,4-pentanedionate,
d. ruthenium (III) chloride,
e. ruthenium (III) iodide,
f. dichlorotricarbonylruthenium (II) dimer and
g. dodecacarbonyltriruthenium;
(ii)
a. finely divided palladium metal,
b. palladium (II) bromide,
c. palladium (II) 2,4-pentanedionate,
d. palladium (II) chloride,
e. palladium (II) iodide,
f. palladium (II) nitrate and
g. trimer of palladium (II) acetate;
(iii)
a. finely divided silver metal,
b. silver bromide,
c. silver acetate,
d. silver 2,4-pentanedinoate,
e. silver cyclohexanebutyrate,
f. silver chloride,
g. silver(I)fluoride,
h. silver(II)fluoride,
i. silver iodate,
j. silver nitrate,
k. silver carbonate and
l. silver phosphate;
(iv)
a. indium bromide,
b. indium acetate,
c. indium 2,4-pentanedionate,
d. indium chloride,
e. indium fluoride,
f. indium nitrate and
g. indium isopropoxide;
(v)
a. finely divided iridium metal,
b. iridium(III)2,4-pentanedionate
c. bis-(triphenylphosphine)iridium bromide,
d. bis-(triphenylphosphine)iridium chloride,
e. bis-(triphenylphosphine)iridium iodide,
f. iridium(III)chloride,
g. iridium(IV)chloride and
h. carbonylhydrido-tri-(triphenylphosphine)iridium;
(vi)
a. finely divided platinum metal,
b. platinum(II)bromide,
c. platinum(IV)bromide,
d. dihydrogen hexachloroplatinate(IV),
e. diiido(cycloocta-1,5-diene)platinum(II),
f. platinum(II)2,4-pentanedionate,
g. bis-(triphenylphosphine)platinum(II)chloride,
h. platinum(II)chloride and
i. platinum(IV)chloride.

3. A method of preparing a ceramic material with increased ceramic yield, said method comprising heating a modified R₃SiNH-containing silazane polymer in an inert atmosphere or in a vacuum to a temperature of at least 750° C. until said modified R₃SiNH-containing silazane polymer is converted to a ceramic material with increased ceramic yield relative to a non-modified R₃SiNH-containing silazane polymer heated under the same conditions, wherein said modified R₃SiNH-containing silazane polymer is prepared by mixing the non-modified R₃SiNH-containing silazane polymer with an effective, ceramic yield increasing, amount of a metal or metal compound, wherein said non-modified R₃SiNH-containing silazane polymer is prepared by contacting and reacting in an inert, essentially anhydrous atmosphere, an organochlorosilane or a mixture of organochlorosilanes of general formula $$R_n'SiCl_{(4-n)}$$

with disilazane of general formula $$(R_3Si)_2NH$$

at a temperature in the range of 25° C. to 300° C. while distilling by-produced volatile products, wherein R' is a vinyl group, an alkyl group of 1-3 carbon atoms, or a phenyl group; R is a hydrogen atom, a vinyl group, an alkyl group of 1-3 carbon atoms, or a phenyl group; and n has a value of 1 or 2 and, wherein the metal or metal compound is selected from the group consisting of (i)
a. finely divided ruthenium metal,
b. ruthenium(III)bromide,
c. ruthenium(III)2,4-pentanedionate,
d. ruthenium(III)chloride,
e. ruthenium(III)iodide,
f. dichlorotricarbonylruthenium(II)dimer and
g. dodecacarbonyltriruthenium;
(ii)
a. finely divided palladium metal,
b. palladium(II)bromide,
c. palladium(II)2,4-pentanedionate,
d. palladium(II)chloride,
e. palladium(II)iodide,
f. palladium(II)nitrate and
g. trimer of palladium(II)acetate;
(iii)
a. finely divided silver metal,
b. silver bromide,
c. silver acetate,
d. silver 2,4-pentanedinoate,
e. silver cyclohexanebutyrate,
f. silver chloride,
g. silver(I)fluoride,
h. silver(II)fluoride,
i. silver iodate,
j. silver nitrate,
k. silver carbonate and
l. silver phosphate,
(iv)
a. indium bromide,
b. indium acetate,
c. indium 2,4-pentanedionate,
d. indium chloride,
e. indium fluoride,
f. indium nitrate and
g. indium isopropoxide;
(v)
a. finely divided iridium metal,
b. iridium(III)2,4-pentanedionate
c. bis-(triphenylphosphine)iridium bromide,
d. bis-(triphenylphosine)iridium chloride,
e. bis-(triphenylphosphine)iridium iodide,
f. iridium(III)chloride,
g. iridium(IV)chloride and
h. carbonylhydrido-tri-(triphenylphosphine)iridium;
(vi)
a. finely divided platinum metal,
b. platinum(II)bromide,
c. platinum(IV)bromide,
d. dihydrogen hexachloroplatinate(IV),
e. diido(cycloocta-1,5-diene)platinum(II),
f. platinum(II)2,4-pentanedionate,
g. bis-(triphenylphosphine)platinum(II)chloride,
h. platinum(II)chloride and
i. platinum(IV)chloride.

4. A method of preparing a ceramic material with increased ceramic yield, said method comprising heating a modified R₃SiNH-containing silazane polymer in an inert atmosphere or in a vacuum to a temperature of at least 750° C. until said modified R₃SiNH-containing silazane polymer is converted to a ceramic material with increased ceramic yield relative to a non-modified R₃SiNH-containing silazane polymer heated under the same conditions, wherein said modified R₃SiNH-containing silazane polymer is prepared by mixing the non-modified R₃SiNH-containing silazane polymer with an effective, ceramic yield increasing, amount of a metal or metal compound, wherein said non-modified R₃SiNH-containing silazane polymer is prepared by contacting and reacting in an inert, essentially anhydrous atmosphere, trichlorosilane with a disilazane at a temperature in the range of 25° C. to 300° C. while distilling by-produced volatile products, wherein said disilazane has the general formula $$(R_3Si)_2NH$$

where R is a hydrogen atom, a vinyl group, an alkyl group containing 1-3 carbon atoms, or a phenyl group and, wherein the metal or metal compound is selected form the group consisting of
(i)
a. finely divided ruthenium metal,
b. ruthenium(III)bromide,
c. ruthenium(III)2,4-pentanedionate,
d. ruthenium(III)chloride,
e. ruthenium(III)iodide,
f. dichlorotricarbonylruthenium(II)dimer and
g. dodecacarbonyltriruthenium;
(ii)
a. finely divided palladium metal,
b. palladium(II)bromide,
c. palladium(II)2,4-pentanedionate,
d. palladium(II)chloride,
e. palladium(II)iodide,
f. palladium(II)nitrate and
g. trimer of palladium(II)acetate;
(iii)
a. finely divided silver metal,
b. silver bromide,
c. silver acetate,
d. silver 2,4-pentanedinoate,
e. silver cyclohexanebutyrate,
f. silver chloride, g. silver(I)fluoride,
h. silver(II)fluoride,
i. silver iodate,
j. silver nitrate,
k. silver carbonate and
l. silver phosphate;
(iv)
  a. indium bromide,
  b. indium acetate,
  c. indium 2,4-pentanedionate,
  d. indium chloride,
  e. indium fluoride,
  f. indium nitrate and
  g. indium isopropoxide;
(v)
  a. finely divided iridium metal,
  b. iridium(III)2,4-pentanedionate
  c. bis-(triphenylphosphine)iridium bromide,
  d. bis-(triphenylphosphine)iridium chloride,
  e. bis-(triphenylphosphine)iridium iodide,
  f. iridium(III)chloride,
  g. iridium(IV)chloride and
  h. carbonylhydrido-tri-(triphenylphosphine)iridium;
(vi)
  a. finely divided platinum metal,
  b. platinum(II)bromide,
  c. platinum(IV)bromide,
  d. dihydrogen hexachloroplatinate(IV),
  e. diiido(cycloocta-1,5-diene)platinum(II),
  f. platinum(II)2,4-pentanedionate,
  g. bis-(triphenylphosphine)platinum(II)chloride,
  h. platinum(II)chloride and
  i. platinum(IV)chloride.

5. A method as defined in claim 1 wherein said ruthenium compound is a ruthenium(III)2,4-pentanedionate.

6. A method as defined in claim 2 wherein said ruthenium compound is a ruthenium(III)2,4-pentanedionate.

7. A method as defined in claim 3 wherein said ruthenium compound is a ruthenium(III)2,4-pentanedionate.

8. A method as defined in claim 4 wherein said ruthenium compound is a ruthenium(III)2,4-pentanedionate.

9. A method as defined in claim 1 wherein said palladium compound is a palladium(II)2,4-pentanedionate compound.

10. A method as defined in claim 2 wherein said palladium compound is a palladium(II)2,4-pentanedionate compound.

11. A method as defined in claim 3 wherein said palladium compound is a palladium(II)2,4-pentanedionate compound.

12. A method as defined in claim 4 wherein said palladium compound is a palladium(II)2,4-pentanedionate compound.

13. A method as defined in claim 1 wherein said silver compound is silver nitrate or silver 2,4-pentanedionate.

14. A method as defined in claim 2 wherein said silver compound is silver nitrate or silver 2,4-pentanedionate.

15. A method as defined in claim 3 wherein said silver compound is silver nitrate or silver 2,4-pentanedionate.

16. A method as defined in claim 4 wherein said silver compound is silver nitrate or silver 2,4-pentanedionate.

17. A method as defined in claim 1 wherein said indium compound is indium 2,4-pentanedionate or indium isopropoxide.

18. A method as defined in claim 2 wherein said indium compound is indium 2,4-pentanedionate or indium isopropoxide.

19. A method as defined in claim 3 wherein said indium compound is indium 2,4-pentanedionate or indium isopropoxide.

20. A method as defined in claim 4 wherein said indium compound is indium 2,4-pentanedionate or indium isopropoxide.

21. A method as defined in claim 1 wherein said iridium compound is bis(triphenylphosphine)iridium chloride, bis(triphenylphosphoric)iridium bromide, or bis(triphenylphosphoric)iridium iodide.

22. A method as defined in claim 2 wherein said iridium compound is bis(triphenylphosphine)iridium chloride, bis(triphenylphosphoric)iridium bromide, or bis(triphenylphosphoric)iridium iodide.

23. A method as defined in claim 3 wherein said iridium compound is bis(triphenylphosphine)iridium chloride, bis(triphenylphosphine)iridium bromide, or bis(triphenylphosphoric)iridium iodide.

24. A method as defined in claim 4 wherein said iridium compound is bis(triphenylphosphine)iridium chloride, bis(triphenylphosphine)iridium bromide, or bis(triphenylphosphine)iridium iodide.

25. A method as defined in claim 1 wherein said platinum compound is chloroplatinic acid.

26. A method as defined in claim 2 wherein said platinum compound is chloroplatinic acid.

27. A method as defined in claim 3 wherein said platinum compound is chloroplatinic acid.

28. A method as defined in claim 4 wherein said platinum compound is chloroplatinic acid.

* * * * *